No. 738,936. PATENTED SEPT. 15, 1903.
B. A. POTTER & E. D. BLODGETT.
MIRROR FOR LADIES' HATS.
APPLICATION FILED AUG. 6, 1902.
NO MODEL.
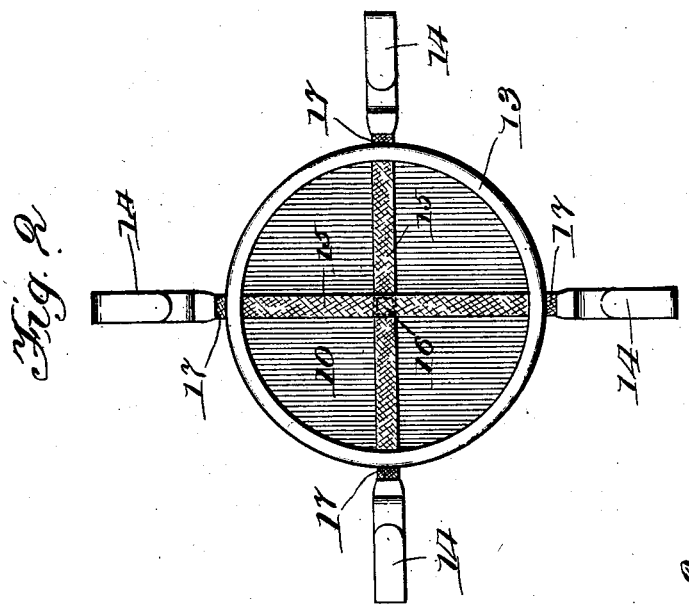
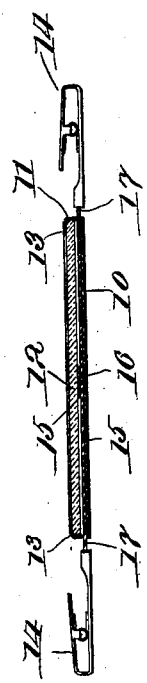
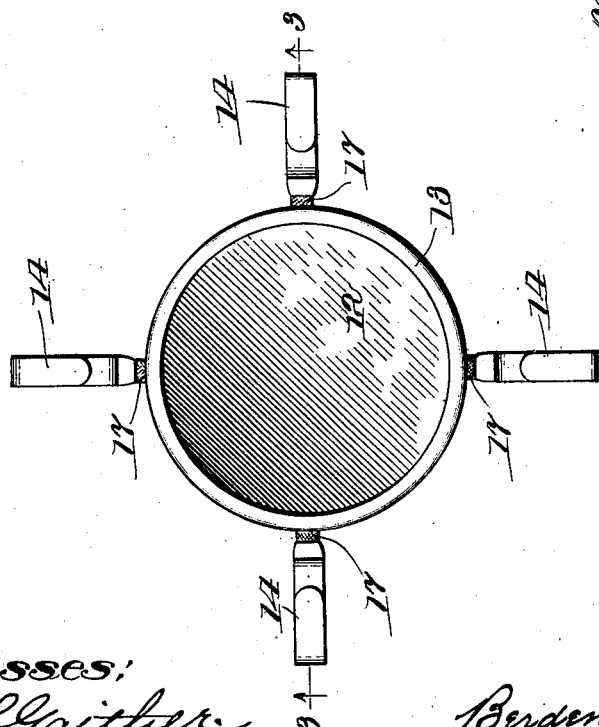
Witnesses:
H. S. Gaither
Helen L. Peck
Inventors,
Berdena A. Potter and
Edgar D. Blodgett
by Wm. O. Bell Attorney.

No. 738,936. Patented September 15, 1903.

UNITED STATES PATENT OFFICE.

BERDENA A. POTTER AND EDGAR D. BLODGETT, OF CHICAGO, ILLINOIS; SAID BLODGETT ASSIGNOR TO SAID POTTER.

MIRROR FOR LADIES' HATS.

SPECIFICATION forming part of Letters Patent No. 738,936, dated September 15, 1903.

Application filed August 6, 1902. Serial No. 118,623. (No model.)

*To all whom it may concern:*

Be it known that we, BERDENA A. POTTER and EDGAR D. BLODGETT, citizens of the United States, residing at Chicago, in the county of Cook and State of Illinois, have invented certain new and useful Improvements in Mirrors for Ladies' Hats, of which the following is a specification.

This invention relates to improvements in mirrors; and its primary object is to provide a mirror which can be conveniently and easily secured in a lady's hat or other headgear.

Another object of the invention is to provide a mirror with flexible fastening devices to enable it to be easily and securely fastened in a hat.

While our invention is particularly intended for use in ladies' hats, it will be apparent that the invention may be just as well arranged in a man's hat, and the fastening devices also enable the mirror to be secured in almost any place and position.

With these and other ends in view we have illustrated one embodiment of the invention in the accompanying drawings, in which—

Figure 1 is a plan view of the mirror. Fig. 2 is a similar view with the glass removed. Fig. 3 is a transverse sectional view on the line 3 3 of Fig. 1.

Like numerals of reference indicate corresponding parts in the several figures, and, referring thereto, 10 designates the frame, having the peripheral flange 11 to receive the glass 12, which is secured in the frame by turning down the edge 13 of the flange, as clearly shown in Fig. 3. This frame and the glass may be constructed of any shape and of any suitable material; but we have shown in the drawings a circular frame and glass, as this appears to be the most convenient shape for ladies' hats.

In order to secure the mirror properly in a hat, we provide two or more clasps 14, which project beyond the edge of the frame and are carried by tapes 15, extending through the frame between the back thereof and the glass, Fig. 3. If four clasps are provided, they will be secured on the ends of two cross-tapes 15, as shown in Fig. 2, and we prefer to fasten these tapes together where they cross each other by stitching 16 or otherwise. If two clasps only are employed, they will be arranged on the ends of a single tape, and while we prefer to provide four clasps, as shown in the drawings, we do not limit the invention to the use of any particular number. The tape projects beyond the periphery of the frame to provide a flexible connection between the clasp and the frame, and thus enable the clasps to be easily manipulated, which is of especial importance in fastening the mirror in ladies' hats, which vary greatly in shape. It has been found sufficient if the tapes project only a short distance beyond the periphery of the frame to provide the flexible connection or joint 17; but this connection may be lengthened or shortened, as shall be found desirable. We have shown in the drawings clasps of common construction; but it is apparent that many other forms of fastening devices and clasps of other constructions may be used with equally good results, although the clasps illustrated are believed to be most satisfactory for the purpose.

A mirror constructed in accordance with our invention can be easily and quickly arranged in a hat, and by reason of the fact that the fastening devices are flexibly connected with the mirror this is more easily accomplished, because it enables these devices to be fastened to the lining of the hat or to the frame of the hat itself in almost any position, and as the frames of ladies' hats are often peculiarly shaped this easy adjustment of the mirror is a feature of considerable importance. The tapes are not fastened rigidly to the frame of the mirror in the preferred construction of our invention, and this enables a clasp on one side to be drawn out farther than usual, if found necessary, without in any way injuring the construction of parts.

A mirror embodying our invention can be manufactured inexpensively and in many varieties of sizes and shapes, and the details of construction of parts may be changed in many ways without departing from the spirit or sacrificing the advantages of the invention.

Having thus fully described our invention, what we claim, and desire to secure by Letters Patent, is—

1. The combination of a mirror, and fastening devices flexibly connected with and adjustable relative to the mirror.

2. The combination of a mirror, and fastening devices flexibly connected with the mirror at its peripheral edge.

3. The combination of a mirror, and fastening devices flexibly and adjustably connected with the mirror at its peripheral edge.

4. The combination of a mirror, a flexible tape extending across and connected with the mirror, and fastening devices carried by the ends of the tape at the peripheral edge of the mirror.

5. The combination of a mirror, tapes extending across and connected with the mirror and crossing each other, and fastening devices carried by the ends of the tapes at the peripheral edge of the mirror.

6. The combination of a mirror, a flexible tape extending across and connected with the mirror and beyond the peripheral edge thereof, and fastening devices carried by the ends of the tape.

7. The combination of a mirror, tapes extending diametrically across and connected with the mirror and crossing each other and fastened together where they cross, and fastening devices carried by the ends of the tapes.

BERDENA A. POTTER.
EDGAR D. BLODGETT.

Witnesses:
RICHARD W. WOLFE,
FRANK A. MAXFIELD,
JAMES D. LACEY.